May 1, 1962  C. R. MOYERS  3,031,918

INSTRUMENT FOR CONTACT LENS PLACEMENT

Filed April 27, 1959

INVENTOR.
CHARLES R. MOYERS
BY John R. Walker, III
Attorney

3,031,918
INSTRUMENT FOR CONTACT LENS PLACEMENT
Charles R. Moyers, Box 129, Jonesboro, Ark.
Filed Apr. 27, 1959, Ser. No. 809,145
3 Claims. (Cl. 88—14)

This invention relates to an instrument for use in placing a contact lens on an eye.

In the placing of a contact lens on the eye, it is the usual practice for the user to place the lens on his finger, which is then moved towards the eye to carry the lens into contact therewith. A contact lens must be accurately centered on the eye, and it will be understood that this is a difficult thing to do when the above mentioned practice is used. This is because as the finger is brought close to the eye, the eye can no longer focus on it and it then becomes guess-work as to whether or not the lens is being directed by the finger straight towards the center of the eye.

The present invention is directed towards overcoming the above mentioned and other problems by providing an instrument comprising a loop-shaped seat for supporting the lens adjacent its periphery and a handle attached to said seat whereby with a lens resting on said seat, said seat is adapted to be moved towards an eye while the eye sights a target through the lens and through the aperture defined by said loop-shaped seat, thus insuring correct alignment of the lens with the eye during the entire placing action.

Thus, one of the principal objects of the present invention is to provide an instrument for accurately, quickly and easily placing a contact lens on an eye.

A further object is to provide such an instrument which includes a target so related to the loop-shaped seat that the target is adapted to be sighted while the lens is being placed on the eye.

A further object is to provide in such an instrument a seat which includes a substantially loop-shaped cushion for supporting the lens.

A further object is to provide a simple, convenient and handy instrument for placing a contact lens on an eye and which instrument is inexpensive to manufacture.

The means by which the foregoing and other objects of the foregoing invention are accomplished and the manner of their accomplishment will be readily understood from the following specification upon reference to the accompanying drawings, in which.

Figure 1:
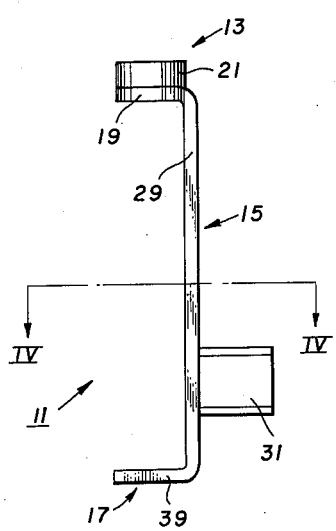
FIG. 1 is a side elevational view of the instrument of the present invention.
Figure 2:
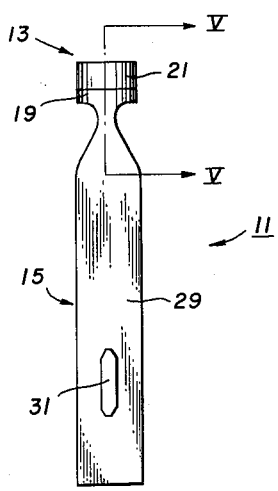
FIG. 2 is a back view thereof.

Referring now to the drawings in which the various parts are indicated by reference characters, the instrument 11 of the present invention includes, in general, a seat 13, a handle 15 attached to seat 13, and a target 17 attached to handle 15.

Seat 13 preferably includes a substantially loop-shaped base 19 and a substantially loop-shaped cushion 21 fixedly mounted on the upper surface of base 19. The outer periphery of seat 13 is preferably oval in configuration to conform to the general shape of the opening of the eye defined by the eyelids. Cushion 21 is preferably formed of sponge rubber or the like and is preferably attached to base 19 as by glue or the like. Cushion 21 defines an aperture 23, and likewise base 19 defines an aperture 25 which is in alignment with aperture 23 so that one continuous aperture 27 is established through seat 13 substantially centrally thereof.

Handle 15 preferably includes an elongated body portion 29 attached adjacent one end thereof to base 19 with the base extending substantially perpendicularly relative thereto. In addition, handle 15 preferably includes a projection 31 attached to body portion 29 intermediate the ends thereof and projecting outwardly therefrom in a direction substantially opposite from the direction of the extension of base 19 from the body portion, and with the projection being substantially parallel to the longitudinal axis of body portion 29.

Figure 3:
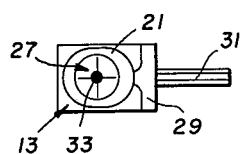
FIG. 3 is a top view thereof.
Figure 4:
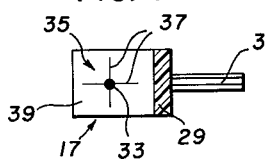
FIG. 4 is a sectional view taken as on the line IV—IV of FIG. 1.

Target 17 is attached to the end of handle 15 opposite from seat 13 in spaced relationship with the seat and extending therebelow in the same direction from body portion 29 as the seat and arranged so that when the instrument is viewed from the top as in FIG. 3, the center 33 of the target design 35 appears in alignment with the center of aperture 27. Target design 35 preferably includes, in addition to target center 33, radially-spaced lines 37, extending outwardly from target center. Target design 35 is imprinted on a plate 39 to establish target 17, and which plate is attached to the end of body portion 29 opposite from seat 13.

Base 19, handle 15, and plate 39 are preferably of integral construction and preferably formed from plastic or the like so as to provide for inexpensive and easy manufacture of instrument 11.

Figure 5:
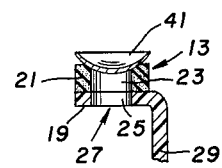
FIG. 5 is a fragmentary sectional view taken as on the line V—V of FIG. 2, and showing a lens in place on the seat of the instrument.
Figure 6:
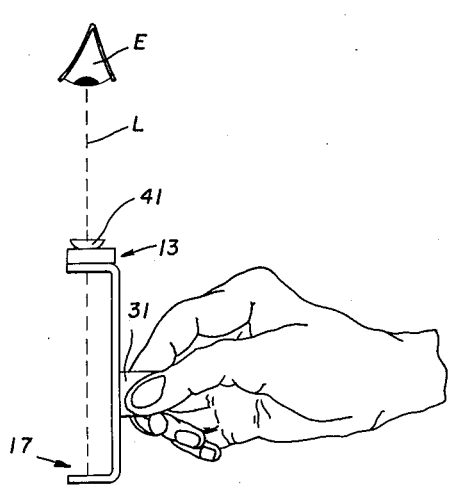
FIG. 6 is a view on a reduced scale showing how the present invention is used to place a lens on an eye.

In using instrument 11, a contact lens 41 is placed on seat 13 with the seat supporting the lens adjacent the periphery thereof so that the center of the lens is substantially in alignment with aperture 27, as best seen in FIG. 5. With lens 41 in the position as above described, and with the usual wetting agent applied on the lens, the projection 31 is grasped as between the fingers as shown in FIG. 6, and the instrument 11 is aligned with the line of sight L of eye E as shown in FIG. 6, so that the eye sights target 17 through lens 41 and aperture 27. Then the instrument 11 is moved directly towards eye E, along the line of sight L. This movement is continued until the lens 41 is carried into contact with the eye. It will be understood that as long as the target is aligned through aperture 27, there is no chance for error and the lens 41 will be placed in the proper position on eye E.

Figure 7:
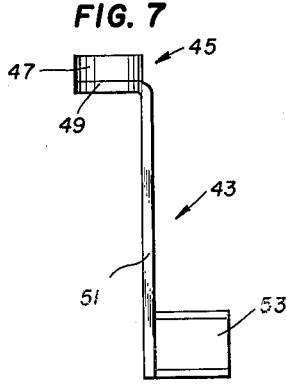
FIG. 7 is a modified form of the present invention.

In the modified form shown in FIG. 7, the target is omitted. Otherwise, the construction of the modified form is substantially the same as that above described for the preferred form. Thus, a seat 45 includes a cushion 47 similar to cushion 21 and a base 49 similar to base 19. Handle 43 includes an elongated body portion 51 attached adjacent one end to base 49 and including a projection 53 attached to the elongated portion 51 adjacent the end thereof opposite from base 49 and extending in the opposite direction from the base. The modified form is used in the same manner as that heretofore described for the preferred form except that in place of sighting on target 17, a target is selected at random which is used to sight on while the lens is being placed on the eye. For example, a spot on the floor or on a table may be selected and the eye focused on that spot during the placement of the lens.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A manual instrument for placing a contact lens on an eye, said instrument comprising a seat including a substantially loop-shaped base and a substantially loop-shaped cushion mounted on the base, said base and said cushion being substantially in alignment and establishing a continuous aperture through said seat, a handle including an elongated body portion and a projection extending from said body portion adapted to be grasped, said loop-shaped base being substantially rigid relative to said handle, said body portion adjacent one end thereof being attached to said base with said base extending substantially perpendicularly from said body portion in the opposite direction from said projection, and a target including a plate having a target design imprinted thereon, said plate being attached to said body portion adjacent the opposite end thereof from said seat and in alignment with said aperture; said seat, said handle and said target being fixed relative to one another whereby with a contact lens resting on said cushion said seat is adapted to be moved towards an eye to carry the lens into contact with the eye while the eye sights the target through the lens and said aperture.

2. A manual instrument for placing a contact lens on an eye, said instrument comprising a seat including a substantially loop-shaped base and a substantially loop-shaped cushion mounted on the base, said base and said cushion being substantially in alignment and establishing a continuous aperture through said seat, a handle including an elongated body portion and a projection extending from said body portion adapted to be grasped, said loop-shaped base being substantially rigid relative to said handle, said body portion adjacent one end thereof being attached to said base with said base extending substantially perpendicularly from said body portion in the opposite direction from said projection, and a target mounted on said handle in spaced relationship with said seat and in alignment therewith; said seat, said handle and said target being fixed relative to one another whereby with a contact lens resting on said cushion said seat is adapted to be moved towards an eye to carry the lens into contact with the eye while the eye sights the target into the lens and said aperture.

3. A manual instrument for placing a contact lens on an eye, said instrument comprising a seat for supporting the lens adjacent the periphery of the lens, said seat being provided with an aperture extending therethrough and disposed substantially centrally of the seat whereby the lens carried by said seat and the aperture is adapted to be sighted through, a handle connected to said seat for moving said seat towards the eye to carry the lens into contact with the eye, said handle being substantially rigid relative to said seat, a target mounted on said handle in spaced relationship with said seat and in alignment therewith; said seat, said handle and said target being fixed relative to one another whereby during movement of said seat towards the eye said target is adapted to be sighted through said aperture and the lens.

References Cited in the file of this patent

UNITED STATES PATENTS

| | | |
|---|---|---|
| 1,548,780 | Herbert | Aug. 4, 1925 |
| 1,605,725 | Herbert | Nov. 2, 1926 |
| 2,352,179 | Bolsey | June 27, 1944 |
| 2,379,629 | Eweson | July 3, 1945 |
| 2,919,696 | Rinaldy | Jan. 5, 1960 |

FOREIGN PATENTS

| | | |
|---|---|---|
| 938,272 | Germany | Jan. 26, 1956 |